United States Patent [19]

Weil

[11] Patent Number: 5,026,745
[45] Date of Patent: Jun. 25, 1991

[54] BIODETERIABLE PLASTICS AND BLENDS

[75] Inventor: Richard C. Weil, Monroeville Borough, Pa.

[73] Assignee: Aristech Chemical Corporation, Pittsburgh, Pa.

[21] Appl. No.: 364,280

[22] Filed: Jun. 12, 1989

[51] Int. Cl.$^5$ .............................. C08L 3/02; C08J 3/00; C08J 5/04
[52] U.S. Cl. .................................................... 524/47
[58] Field of Search ............................. 524/47; 525/78

[56] References Cited

U.S. PATENT DOCUMENTS

| | | | |
|---|---|---|---|
| 3,436,309 | 4/1969 | Ottinger et al. | 435/99 |
| 3,704,271 | 11/1972 | Prahl et al. | 524/734 |
| 3,867,324 | 2/1975 | Clendinning et al. | 525/302 |
| 3,901,838 | 8/1975 | Clendinning | 525/302 |
| 3,921,333 | 11/1975 | Clendinning et al. | 47/74 |
| 4,076,663 | 2/1978 | Masuda et al. | 527/301 |
| 4,133,784 | 1/1979 | Otey et al. | 524/52 |
| 4,332,749 | 6/1982 | Pleska | 264/13 |
| 4,472,555 | 9/1984 | Schmukler et al. | 525/78 |
| 4,824,736 | 4/1989 | Ehrig et al. | 428/623 |

Primary Examiner—Nathan M. Nutter
Attorney, Agent, or Firm—William L. Krayer

[57] ABSTRACT

Improved mechanical properties have been obtained in a biodeteriable polypropylene by mixing starch with a polypropylene modified with maleic anhydride.

8 Claims, No Drawings

BIODETERIABLE PLASTICS AND BLENDS

Technical Field

This invention is in the field of biodeteriable plastics and particularly biodeteriable polypropylene blends. By biodeteriable, I mean having the ability to deteriorate or disintegrate through the action of (a) living organisms, typically by the metabolism by bacteria of portions of the products of the invention, or (b) autoxidation made possible by the physical structure of the product which permits channeling or other mechanisms for the permeation of oxygen. The term "biodeteriable" is used in preference to "biodegradable" because the products of the invention are intended to disintegrate under certain conditions, such as upon burial.

Background Art

Prior to the present invention it has been known to modify polypropylene by first preparing polypropylene and then reacting it with maleic anhydride under stressful conditions such as mechanical agitation (see such early patents as 2,973,344), typically in the presence of an oxidizing agent. See U.S. Pat. Nos. 3,414,551, 3,862,265 and 4,506,056.

A measure of biodegradability has been imparted to certain plastics in the past: see U.S. Pat. No. 3,901,838.

Starch has been mixed with ethylene/ acrylic acid copolymers to form biodegradable films, as recited in U.S. Pat. No. 4,133,784; the copolymer is, however, water-dispersible. A polyolefin-starch composition is described in U.S. Pat. No. 3,704,271.

Disclosure of Invention

In my invention, I blend starch with a polypropylene which has been modified by reactive extrusion with maleic anhydride. That is, the polypropylene—maleic anhydride composition is made by incorporating the maleic anhydride into previously prepared polypropylene in a known manner by reacting the maleic anhydride with polypropylene in the presence of a peroxide. Starch is then mixed with the polypropylene/maleic anhydride and processed to make molded or other formed articles which are biodeteriable. Temperatures during blending should not reach the decomposition temperature of 446° F. for the starch. Temperatures between about 365 and about 440° F. are generally satisfactory.

Detailed Description of the Invention

Various blends of cornstarch and polypropylene, modified and unmodified, were made in a Banbury Mixer (Farrel) at 380° F. using moisturefree Argo cornstarch (oven dried overnight at 80° C. in a vacuum oven, at about 27 mm Hg pressure) for 20 min. mixing using a 1150g charge.

The blend was then ground to about 1/8 in. particles.
Sheets approximately 26 mils thick were compression molded in a Wabash Press using the following cycle:
5 min. at 850 psi clamping pressure at 380° F.
7 min. at 23 tons clamping pressure at 380° F.
cooled in 10 min. at 23 tons clamping pressure at 380° F.

Standard polypropylene tensile bars (ASTM 638 Type I) having dimensions of 6-½"×½" by 0.025" were then stamp cut from the sheets.

The bars were then buried in a blend of 50 wt. % woods dirt and 50 wt. % potting soil (blend of sand and spagnum moss) and contained in 5 gal. open-mouth steel cans with unsealed lids. Tap water was added as needed to maintain the moisture content of the solid at 30 wt. %. The pH of the soil was about 6.6.

At the end of the desired burial period, dirt was removed, samples washed clean in tap water, air dried, weighed and tensile strength determined.

Three different sets of preparations were employed, each having five different levels of starch inclusion. They are identified as follows:

FP3F-0%, FP3F-6%, FP3F-15%, FP3F-30%, FP3F-40%.

These were commercial polypropylene (FP3F) having a stabilizer "package" therein and the percent starch indicated (0%, 6%, etc., based on the total sample). The stabilizer package is included by the manufacturer to reduce oxidation and/or thermal decomposition while fabricating packaging items, and it consisted of BHT and calcium stearate.

440-0%, 440-6%, 440-15%, 440-30%, 440-40%.

These were 0.4% maleic anhydride modified polypropylene made as described below and having the "A" stabilizer package (BHT), and a 26 melt flow index, with the starch contents (0%, 6%, etc.) indicated.

340-0%, 340-6%, 340-15%, 340-30%, 340-40%.

These materials had a 12 melt flow index and the "B" stabilizer package (BHT, DSTDP, Irganox 1010, calcium stearate), they were modified with about 0.2% maleic anhydride as described below, and had the starch contents indicated.

Results of the tests are shown in Table I and Table II.

TABLE I

| MATERIAL | BRITTLENESS 0 WEEKS | VISUAL EXAMINATION NOT BURIED | 8 WEEKS BURIAL |
|---|---|---|---|
| FP3F-0 | OK | T-Y | T-Y |
| FP3F-6 | OK | T-Y | OPAQUE |
| FP3F-15 | B | T-Y | OPAQUE |
| FP3F-30 | B | T-Y | OPAQUE |
| FP3F-40 | B | T-Y | W SPOTS |
| 440-0 | OK | OPAQUE | T |
| 440-6 | OK | T | CLEAR |
| 440-15 | OK | T | CLEAR |
| 440-30 | OK | L T | CLEAR |
| 440-40 | B | D T | W,R,BR, SPOTS ROUGH |
| 340-0 | OK | L T | L T |
| 340-6 | OK | L T | L T |
| 340-15 | OK | L T | OPAQUE |
| 340-30 | B | D T | W SPOTS ROUGH |
| 340-40 | B | L T | W,R,BR, SPOTS ROUGH |

BR-brown; BL-black; R-red; Y-yellow; G-green; W-white; T-tan; L-light; D-dark

TABLE II

| | Tensile Strength, psi | | Tensile Strength Retained, % |
|---|---|---|---|
| MATERIAL | 0 WEEKS BURIAL | 8 WEEKS BURIAL | 8 WEEKS BURIAL |
| FP3F-0 | 4360 | 3978 | 91 |
| FP3F-6 | 4340 | 4366 | 100 |
| FP3F-15 | 2911 | 2785 | 96 |
| FP3F-30 | 3210 | 2587 | 83 |
| FP3F-40 | 2682 | 2441 | 91 |
| 440-0 | 5285 | 5167 | 98 |
| 440-6 | 5126 | 5293 | 100 |

TABLE II-continued

| MATERIAL | Tensile Strength, psi | | Tensile Strength Retained, % |
| --- | --- | --- | --- |
| | 0 WEEKS BURIAL | 8 WEEKS BURIAL | 8 WEEKS BURIAL |
| 440-15 | 5303 | 5118 | 97 |
| 440-30 | 5268 | 4934 | 94 |
| 440-40 | 4410 | 2895 | 66 |
| 340-0 | 4865 | 5167 | 100 |
| 340-6 | 5005 | 4965 | 100 |
| 340-15 | 5079 | 5004 | 100 |
| 340-30 | 3950 | 3732 | 94 |
| 340-40 | 3815 | 1916 | 50 |

The maleic anhydride modified polypropylenes described above were made by reaction extrusion at temperatures between 380° and 450° F. using between 0.5 and 2.5 wt% maleic anhydride and 0.3 to 0.13 wt% peroxide initiator.

The polypropylene I used for the tests described in the above tables was a 0.5 melt-flow unstabilized homopolymer.

Maleic anhydride modified polypropylene (MAPP) useful in my invention, may be made by the method described in Example 1 of U.S. Pat. No. 4,824,736, of which I am co-inventor; this patent is incorporated herein by reference. Other suitable methods are also known in the art and are described, for example, in U.S. Pat. Nos. 3,932,368, 3,862,265, 4,026,967, 3,414,551 and 4,506,056.

A preferred range of ratios of polypropylene to maleic anhydride in the MAPP product is about 1000:1 to about 100:1; alternatively, the MAPP copolymer may contain about 0.1% to about 1.0 weight percent maleic anhydride.

The starch has the general formula $(C_6H_{10}O_5)_n$, where n is greater than 1000. As much as 50% starch may be blended with the MAPP; while a very small amount (such as 1% by weight) of starch will have a correspondingly effective beneficial effect, I prefer to use at least about 6 percent by weight starch.

I claim:

1. A biodeteriable composition comprising a blend of (1) a graft-copolymer of maleic anhydride and polypropylene and (2) about 1% to about 50% by weight starch based on the total composition.

2. Composition of claim 1 wherein the copolymer is made by reaction extrusion.

3. Composition of claim 1 wherein the ratio of polypropylene to maleic anhydride is about 1000:1 to about 100:1.

4. Composition of claim 1 in the form of a film or sheet having a thickness of about 1 mil to about 50 mil.

5. Method of making a biodeteriable film or sheet comprising blending about 6 wt% to about 50% starch with a polypropylene/maleic anhydride copolymer at a temperature of about 365 to about 440° F., and forming the resulting blend into a film or sheet.

6. Method of claim 5 wherein the polypropylene/maleic anhydride copolymer contains about 0.1 to about 1.0 wt% maleic anhydride.

7. Composition of claim 1 wherein the starch has the formula $(C_6H_{10}O_5)_n$, where n is greater than 1000.

8. A biodeteriable article formed from the composition of claim 4.

* * * * *

UNITED STATES PATENT AND TRADEMARK OFFICE
CERTIFICATE OF CORRECTION

PATENT NO. : 5,026,745

DATED : June 25, 1991

INVENTOR(S) : Richard C. Weil

It is certified that error appears in the above-identified patent and that said Letters Patent is hereby corrected as shown below:

Column 4, line 32, claim 8, "4" should be -- 1 --.

Signed and Sealed this

Fifteenth Day of December, 1992

Attest:

DOUGLAS B. COMER

*Attesting Officer* — *Acting Commissioner of Patents and Trademarks*